(12) United States Patent
Khanduja et al.

(10) Patent No.: US 9,959,278 B1
(45) Date of Patent: May 1, 2018

(54) METHOD AND SYSTEM FOR SUPPORTING BLOCK-LEVEL INCREMENTAL BACKUPS OF FILE SYSTEM VOLUMES USING VOLUME PSEUDO DEVICES

(75) Inventors: Vaibhav Khanduja, Bangalore (IN); Shankar Balasubramanian, Bangalore (IN)

(73) Assignee: EMC IP HOLDING COMPANY LLC, Hopkinton, NJ (US)

( * ) Notice: Subject to any disclaimer, the term of this patent is extended or adjusted under 35 U.S.C. 154(b) by 0 days. days.

(21) Appl. No.: 13/248,408

(22) Filed: Sep. 29, 2011

(51) Int. Cl.
*G06F 17/30* (2006.01)
*G06F 11/14* (2006.01)

(52) U.S. Cl.
CPC .... *G06F 17/30088* (2013.01); *G06F 11/1446* (2013.01)

(58) Field of Classification Search
None
See application file for complete search history.

(56) References Cited

U.S. PATENT DOCUMENTS

| | | | |
|---|---|---|---|
| 5,689,706 A * | 11/1997 | Rao et al. | |
| 5,913,061 A * | 6/1999 | Gupta et al. | 719/310 |
| 6,981,114 B1 | 12/2005 | Wu et al. | |
| 7,039,739 B2 * | 5/2006 | Bonola | 710/262 |
| 7,158,991 B2 * | 1/2007 | Kekre et al. | |
| 7,191,304 B1 * | 3/2007 | Cameron | G06F 11/1456 707/999.202 |
| 7,383,294 B1 * | 6/2008 | Tamer et al. | 707/810 |
| 7,424,592 B1 | 9/2008 | Karr et al. | |
| 7,765,167 B2 * | 7/2010 | Prahlad et al. | 705/400 |
| 8,005,797 B1 * | 8/2011 | Chepel et al. | 707/649 |
| 8,055,613 B1 * | 11/2011 | Mu et al. | 707/610 |
| 8,069,149 B1 | 11/2011 | Chen et al. | |
| 8,117,410 B2 * | 2/2012 | Lu et al. | 711/162 |
| 8,266,106 B2 * | 9/2012 | Prahlad et al. | 707/640 |
| 8,346,727 B1 * | 1/2013 | Chester et al. | 707/640 |
| 2002/0107877 A1 * | 8/2002 | Whiting et al. | 707/204 |
| 2005/0091221 A1 * | 4/2005 | Harris et al. | 707/10 |
| 2009/0172641 A1 | 7/2009 | Wong et al. | |
| 2011/0022811 A1 * | 1/2011 | Kirihata | G06F 3/0608 711/162 |
| 2011/0078119 A1 * | 3/2011 | Soran et al. | 707/649 |
| 2011/0088027 A1 | 4/2011 | Jelvis et al. | |
| 2011/0173160 A1 * | 7/2011 | Kryger | 707/649 |

(Continued)

*Primary Examiner* — Charles D Adams
(74) *Attorney, Agent, or Firm* — Dergosits & Noah LLP; Todd A. Noah (57) ABSTRACT

A method for performing block-level incremental backups of file system volumes using a pseudo device layer of a volume manager. A driver associated with a snapshot backup program is configured to back up the full pseudo disk upon receipt of a backup request, and not automatically performed upon startup. Incremental backups are performed thereafter using a driver that has been modified to include a monitor that tracks writes during backups. The standard I/O routine of the kernel is overwritten with an I/O routine that tracks write operations. The volume manager is called back to perform the incremental backup operations upon each write operation. The going down routine of the kernel is also overwritten to track any updates to the volume manager. If the volume manager is updated, the data structure is cleared and future backups are performed from a subsequent full backup.

17 Claims, 6 Drawing Sheets

(56) References Cited

U.S. PATENT DOCUMENTS

| | | |
|---|---|---|
| 2011/0191297 A1* | 8/2011 | Beck .............................. 707/639 |
| 2011/0202719 A1* | 8/2011 | Rossi et al. ................... 711/114 |
| 2011/0218968 A1* | 9/2011 | Liu et al. ...................... 707/649 |
| 2011/0246731 A1 | 10/2011 | Ninose et al. |
| 2012/0016842 A1* | 1/2012 | Furuya .......................... 707/649 |
| 2012/0109958 A1 | 5/2012 | Thakur et al. |
| 2012/0233123 A1* | 9/2012 | Shisheng et al. ............. 707/639 |

* cited by examiner

METHOD AND SYSTEM FOR SUPPORTING BLOCK-LEVEL INCREMENTAL BACKUPS OF FILE SYSTEM VOLUMES USING VOLUME PSEUDO DEVICES

BACKGROUND

Supporting backups for a high-density file system using traditional mechanism of walking through the files and collecting information can often be very slow. Snapshot backup programs, such as the Networker SnapImage Module solve this problem by taking snapshot of the file system to perform live backups at block level. Block level systems support volume managers that back up volumes, which may comprise multiple disks. These volume managers may support various data distribution formats, such as concatenated, striped, RAID, mirrors, and so on. Mirror formats provide a level of data protection and failover or switchover capability over the simple striped or concat data distribution format. Reading file system data at the block level thus requires a thorough understanding of disk data organization, and with ever changing layouts of disk data organization, this creates new challenges for snapshot backup SnapImage programs. Changes in layout formats that are introduced with newer software versions or newer operating systems increase these challenges even further.

Existing solutions for block-level incremental backup systems are built around discovering the storage stack from the volume manager pseudo device till the lowest level disk. The backup and recover operations are performed using the lowest disk and input/output (I/O) calls are intercepted at the same level. Although this solution may work in most of the situations, a high degree of software maintenance is required to ensure proper operation.

A typical storage stack production environment consists of a file system (FS) that is supported by a volume manager (VM). Present volume managers support the common disk layouts of concatenated, striped, mirror, and RAID. For high availability or load balancing each device may be seen through more than one path by the volume manager such as in multi-pathing solutions provided by Veritas dynamic multipath (VxDMP) and EMC (PowerPath). In order to support block level backups, backup vendors need to understand the volume manager layout structures, i.e., concatenated, striped, mirror, etc. These layout formats change across operating systems and volume managers. To ensure proper operation, backup vendors must also understand the failovers handled by volume manager and the ones happening at the device path level, and the load balancing that happens at the volume manager and at the disk path level, as well as have an understanding of advance volume manager features like hot swap-able or relocation of devices.

In general, this level of understanding must be built around the whole storage stack environment. Because there is no standardized implementation, however, each vendor tends to follow its own propriety specification. The approach changes with different operating systems and even between different versions of the same operating system. For example, Solaris may not follow what HP-UX guides or implements with regard to the storage stack. Furthermore, the lowest level disk technology changes across operating systems and may change with scalability. The discovery of storage stack implementations may occasionally be obtained using vendor provided APIs (application program interfaces) or CLIs (command line interfaces), but mostly it requires performing reverse engineering. Such reverse engineering performing disk binary reads and trying to decipher how the block level processes work. This is not only time-consuming and costly, but may provide a solution that does not cover all likely usage scenarios and may not work for future releases.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The subject matter presented herein provides for backups that operate at the volume layer and utilizes the pseudo device layer that exists between the file system layer and the device layer. Present backup systems perform block level backups at the disk level. This limits snapshot applications to use proprietary drivers compatible with specific volume managers due to unpublished information regarding translation between file system extents to disk extents. Embodiments of a method operate at the volume layer and utilize the pseudo device layer that exists between the file system layer and the device layer. The full pseudo disk (0-n) is backed up only upon receipt of a backup request, and not automatically performed upon startup. Incremental backups are performed thereafter using a driver that has been modified to include a monitor that tracks writes during backups. The standard I/O routine of the kernel is overwritten with an I/O routine that tracks write operations. The volume manager is called back to perform the incremental backup operations upon each write operation. The going down routine of the kernel is also overwritten to track any updates to the volume manager. If the volume manager is updated, the data structure is cleared and future backups are performed from a subsequent full backup.

Figure 1:
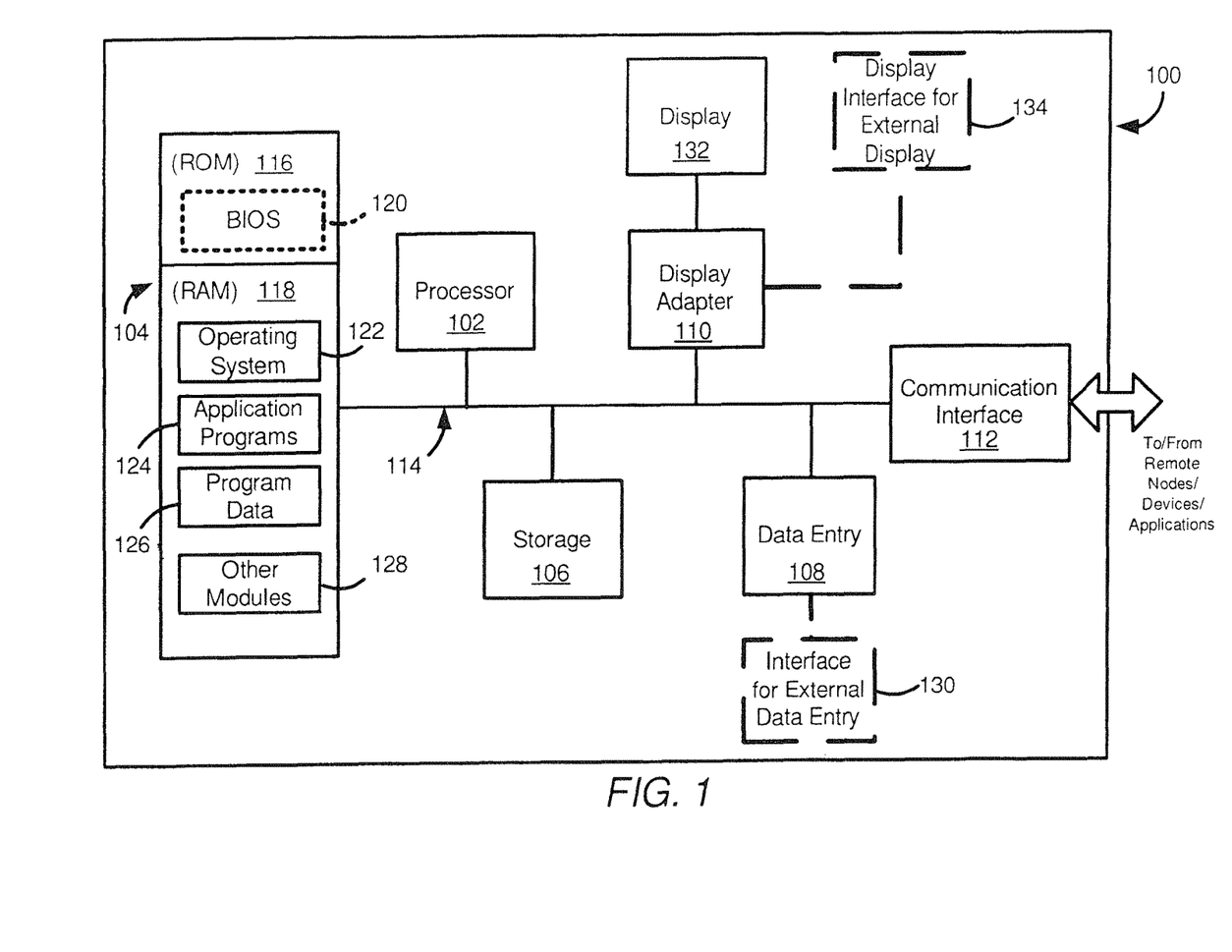
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

In an embodiment, system 100 of FIG. 1 represents a Unix-based system, in which there are two general kinds of device files, known as character (char) special files and block special files. Character files relate to devices through which the system transmits data one character at a time. These device nodes often implement streaming communication with devices such as mice, keyboards, terminal, and so on. Block files correspond to devices through which the system moves data in the form of blocks. These device nodes often represent addressable devices such as memory, hard disks, CD-ROM drives, and so on, that support random access and seeking. Device nodes on Unix-based systems do not necessarily have to correspond to physical. Nodes that lack this correspondence form the group of pseudo-devices. Most file systems are based on a block device, and block storage is normally abstracted by a file system or database management system for use by applications and end users.

In backup systems, block storage is typically handled by logical volume management (LVM) system.

Figure 2:
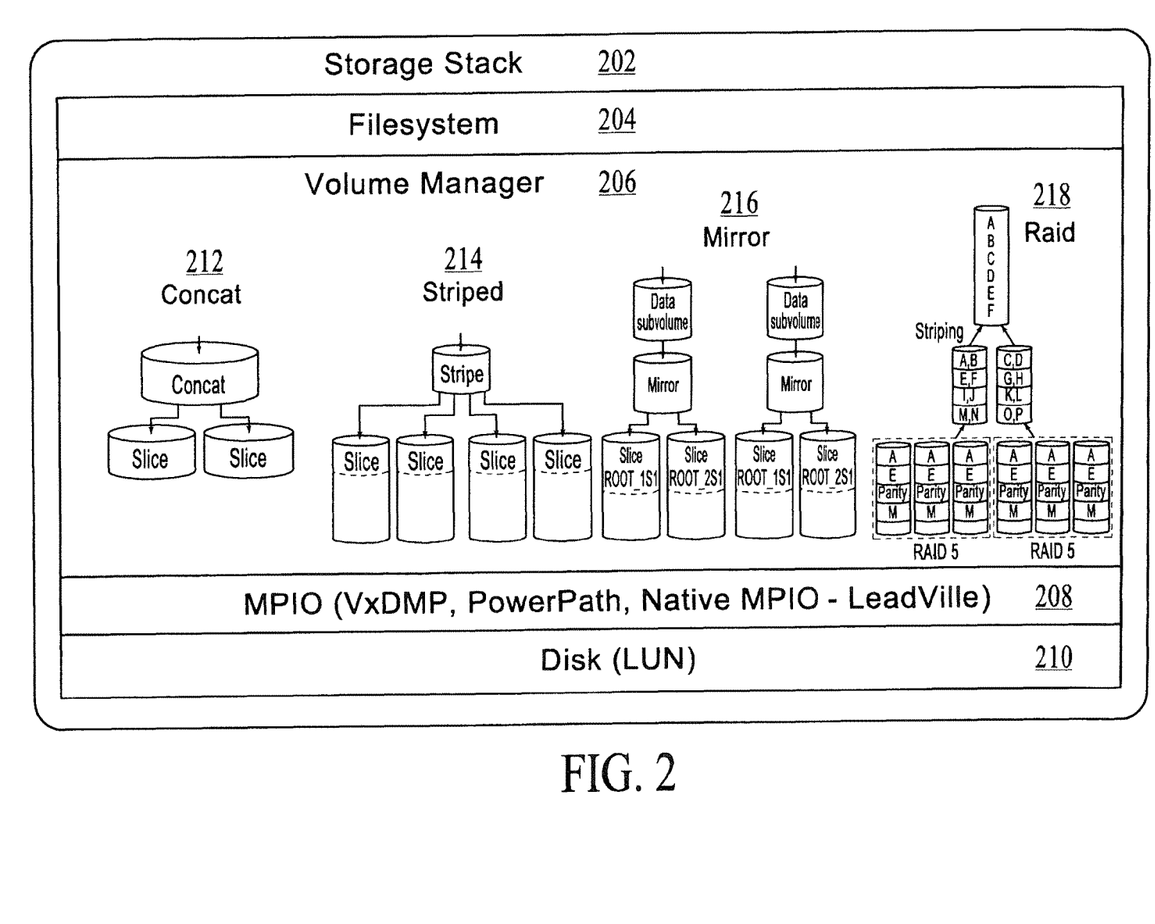
FIG. 2 is a block diagram illustrating an example storage system environment for performing pseudo-disk backups according to an embodiment.

FIG. 2 illustrates a storage stack production environment 202 that may be used with embodiments. The arrangement of components in FIG. 2 may be implemented by some or all of the components of the hardware device 100 of FIG. 1. The top-level of storage stack system 202 is the file system 204. The file system 204 serves to organize the data that is retained after a program using the data terminates. It provides procedures to store, retrieve, and update the data, and manages the available space on the storage devices that store the data. Various different file systems may be provided by different software vendors, and snapshot programs are configured to support particular file systems. For example, the SnapImage program supports VxFS (Veritas file system) and UFS (Unix file system). Below the filesystem layer 204 is the volume manager 206, which could be VxVM, HPLVM or Solaris LVM (logical volume manager). The volume manager 204 implements a form of storage virtualization. The volume manager map physical volumes or "physical extents" (e.g., hard disk partitions or logical unit numbers) of an external storage device to logical extents. These logical extents can then be manipulated in flexible ways depending on the types of disk organizations implemented in the system. For the embodiment of FIG. 2, the volume manager 206 supports concatenated (concat) 212, striped 214, mirror 216, and RAID-based 218 disk organizations.

For certain volume managers, such as the Veritas volume manager VxVM, a pseudo device of the volume is created by the volume manager layer. UNIX as an operating system mandates that each pseudo device be given a unique number called a minor device number. This minor device number is unique for a particular type of device. Each type of device is also uniquely identified by a major number. Thus, device nodes correspond to resources that the OS kernel has already allocated, and these resources are identified by a major number and a minor number. Generally, the major number identifies the device driver and the minor number identifies a particular device that the driver controls.

Volume managers, such as VxVM typically provide both volume management and multi-path input/output (I/O) functionalities. Thus, as shown in FIG. 2, the volume manager layer 206 interfaces with a multipath I/O (MPIO) layer 208. The MPIO layer 208 provides a plurality of physical paths between the processor in the system and the mass storage devices through the interface components (e.g., bus, switches, etc.) to provide redundancy, fault-tolerance and enhanced performance. In an embodiment, the MPIO layer 208 of FIG. 2 may be an MPIO that is compatible with particular volume manager 206. For example, for a Veritas volume manager, the MPIO may be the Symantec Dynamic Multipathing (DMP) component, or the PowerPath™ component provided by EMC, or any other commercially available or native MPIO component. The MPIO layer 208 provides the interface to the physical storage device 210, such as a disk that is accessed through a unique LUN.

Embodiments of the volume manager component of FIG. 2 implement a snapshot backup program, such as the SnapImage program. SnapImage reduces the strain on server performance through block-level image backup. SnapImage takes a filesystem snapshot, builds a block list, and then backs up the data through the server as virtually one large file. Although embodiments may be directed to backup systems that include a SnapImage program, it should be noted that any similar snapshot program may be used, and the term "snapshot program" is intended to cover the SnapImage program or any similar volume or block-based backup program. The SnapImage (and any similar snapshot program) works on the block-level and includes a driver that tracks I/O writes to the blocks. During a backup operation, the program correlates the disk blocks to the appropriate files by passing the file system.

In general, the snapshot file system is an exact copy of the original file system as it is made at the time of the snapshot operation. A snapshot file system is read-only and exists only as long as it and the file system that has been snapped are mounted. A snapshot file system consists of a super-block, a bitmap, a blockmap, and data blocks copied from the snapped file system. The super-block is similar to the super-block of a normal VxFS file system, and is followed by a bitmap contains one bit for every block on the snapped file system. Bitmap entries are initially set to zero and a set bit in the bitmap indicates that the appropriate block was copied from the snapped file system to the snapshot. The blockmap contains one entry for each block on the snapped file system. When a block is copied from the snapped file system to the snapshot, the appropriate entry in the blockmap is changed to contain the block number on the snapshot file system that holds the data from the snapped file system. The data blocks used by the snapshot file system are filled by any data copied from the snapped file system.

After a snapshot file system is created, the bitmap, blockmap and super-block are initialized and the currently mounted file system is then frozen. The snapshot file system initially satisfies read requests by simply finding the data on the snapped file system and returning it to the requesting process. When an update or a write changes the data in a block of the snapped file system, the old data is first read and copied to the snapshot before the snapped file system is updated. The bitmap entry for that block is changed from 0 to 1 to indicate that the data for the block can be found on the snapped file system. The blockmap entry for the block is changed to the block number on the snapshot file system containing the old data. A subsequent read request for the block on the snapshot file system is satisfied by checking the bitmap entry for the block and reading the data from the indicated block on the snapshot file system, rather than from the block on the snapped file system. As data blocks are changed on the snapped file system, the snapshot will gradually fill with data copied from the snapped file system.

Certain use cases can impose challenges on the accuracy of the snapshot file system in a block-based system. In general, a volume manager gives an option to its users with regard to multiple types of layout, i.e., concatenated, striped, mirror, and RAID, as shown in FIG. 2. The approach of taking backups from lowest level disk requires the snapshot program to parse through the disk looking for data as laid out by the volume manager. In the absence of any standards or comprehensive documentation, the approach is highly error prone, and with the addition of any further layout types, the process must be modified again. Furthermore, snapshot programs generally support recovery from disaster in which application data as well as file-system data is recovered onto the target disk. Present disaster recovery methods can only be performed on a volume that is identical in nature and structure as the original volume, and recovery between heterogeneous layouts cannot be performed. For example a backup taken from a striped volume with a particular column width cannot be recovered on a striped volume with a different column width. The complexity of this issue increases with certain high availability features implemented by volume managers, namely the relocation of devices or hot swaps, and volume manager support of relocation of devices (LUN) during application runs. The existing approach reads blocks of data from the lowest disk. In this case, a relocation executed by a volume manager during this time does not automatically fail over to the relocated device. Thus, there may be unpredictable issues resulting in data loss. Mirroring is another feature that ensures high availability. The existing solution of reading data from low-level disk cannot ensure right data backup in case of disk failover executed by volume manager. In a typical production environment, devices from backend array are exposed through more one path. Commercially available multi-pathing solutions like VxDMP, EMC PowerPath ensure high availability and load balancing for these devices. For high availability, the lowest level disk is exposed through multiple paths, and the same data can be read either through one path or through multiple paths for high performance. The approach of reading directly from disk fails the objective served by multi-pathing software. The high performance achieved with built-in features like mirroring in the volume manager or adaptive writes through multi-pathing cannot be utilized since existing solution reads data from single path of the disk.

To address these problems, a backup program supports block-level incremental backups of file system volumes using a pseudo device. That is, instead of reading from a low-level disk, a driver component performs reads from the pseudo device. The pseudo device created by volume manager essentially shields its users from all the complexity it establishes in order to support the different layouts of concatenated, striped mirror, etc. The layout format of a pseudo device can be considered to be a simple disk wherein the data can be read in sequential order. Reading the data in sequential order makes the read operations simple and no mapping of the disk to a volume offset is required to be stored. This also satisfies an additional use-case of performing disaster recovery onto a volume layout that is of a completely different format than the source.

According to an embodiment, a method and system for performing disk backups simplifies the block level backups by not performing backups at disk level instead making use of pseudo block device created by volume managers. Every volume manager creates a pseudo device of the created volume. Since a file system has to reside on these devices, the volume manager not only exposes a character pseudo device but also a block pseudo device for the volume. These pseudo block and character devices exhibit the same behavior as any other SCSI disk. The backup vendors can make use of this pseudo device by reading all the blocks of the disk, assuming each block of same size. In the most practical scenario the size of each block is 512 bytes.

As stated above, a volume manager, such as the Veritas volume manager VxVM creates a pseudo disk when it creates a volume. The pseudo disk operates like a normal physical disk in that it can be mounted and read and written to. The pseudo disk does not interact directly with SCSI or other I/O drivers, however, and the volume manager does not answer back to a driver when using the pseudo disk. In an embodiment, a client-side driver used in conjunction with snapshot program is modified to enable interaction with the pseudo disk through the volume manager. This allows the snapshot backup program utilizing the driver to parse and obtain parameters (e.g., size, layout, disk geometry, etc.) for the disk. The driver is modified to hook a call back to the operating system so that it will unload itself under certain conditions. This accommodates the case of the volume manager being upgraded. The driver has also been modified to hook up the call back that comes in the I/O path of the driver, as well as hook up into the call back an indication that the driver has been unloaded. These hooks and call-back mechanisms allow the snapshot program using the driver to track writes by the volume manager, and to track upgrades of the volume manager itself. In the case of a volume manager upgrade, the data structures can be re-initialized to prevent corrupt backup operations.

Figure 3A:
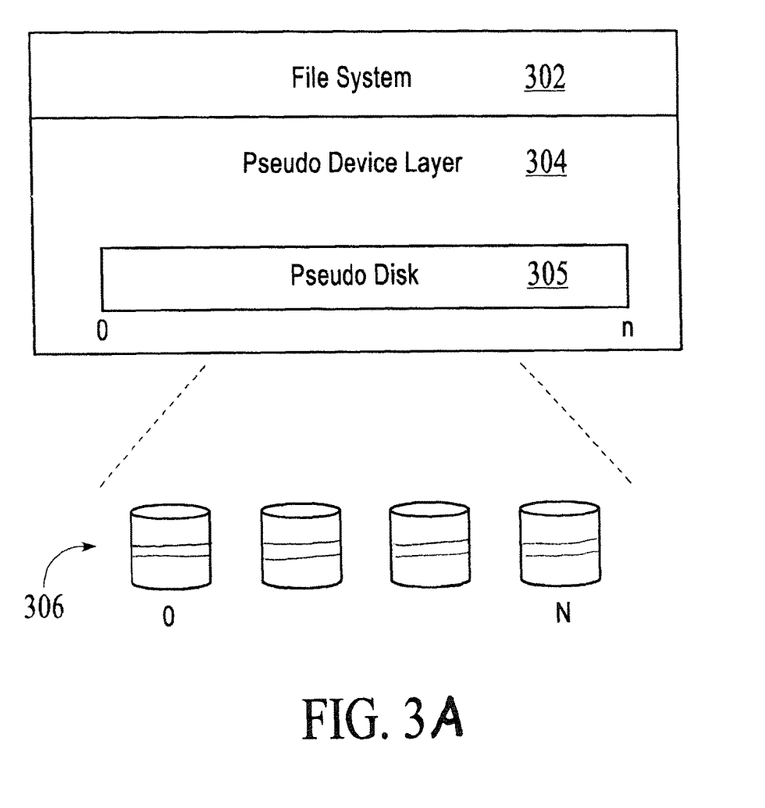
FIG. 3A illustrates the configuration of a pseudo device for performing block-level backups under an embodiment.

FIG. 3A illustrates the configuration of a pseudo device for performing block-level backups under an embodiment. As shown in FIG. 3A, a number (N) physical disks 306 are organized by a volume manager to store data in a particular format, such as a striped layout. The volume manager combines the N disks together and forms a pseudo disk layer 304. Above the pseudo disk layer 304 resides the file system 302. The file system 304 is used by the user applications. Present systems require the translation of file system extents to disk extents to perform backup operations. In an embodiment, the snapshot program works directly with the pseudo disk 305 within the pseudo disk layer 304 to take block level using the simple 0-n offset range of the pseudo disk.

Figure 3B:
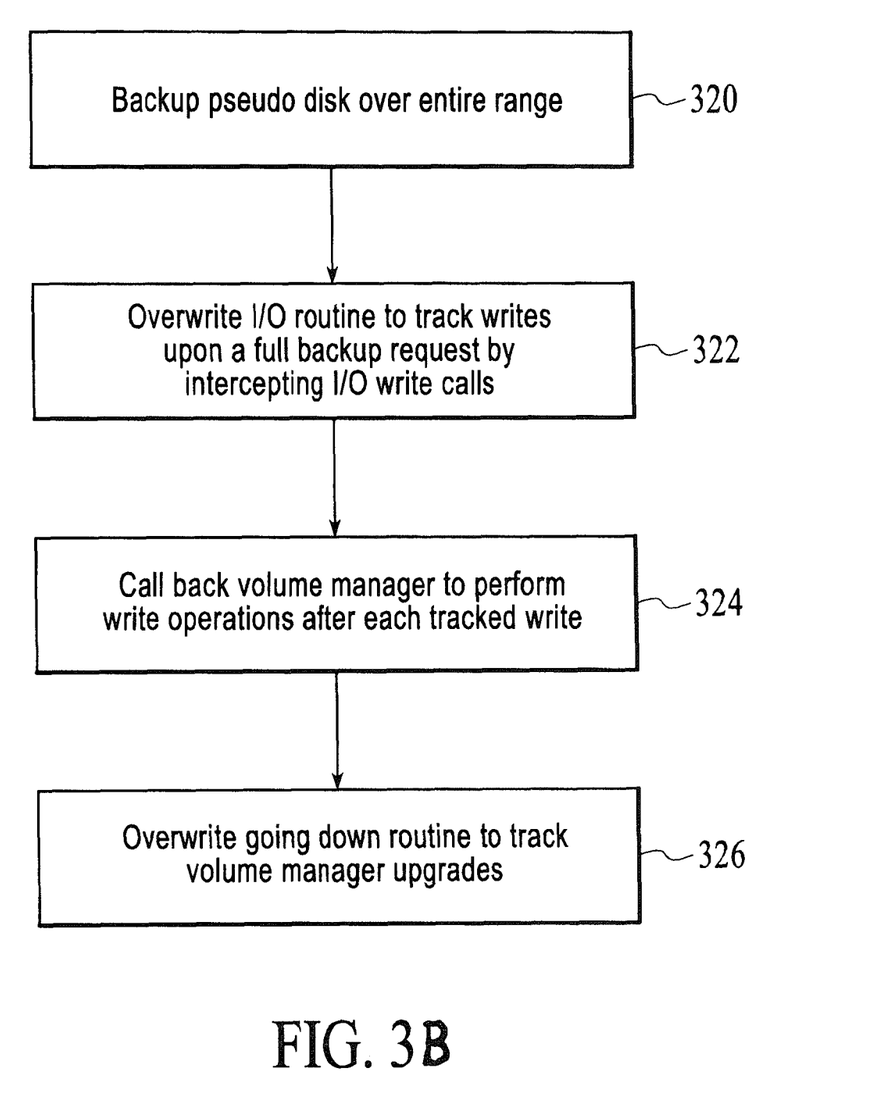
FIG. 3B is a flowchart that illustrates a method of performing block-level backups using a pseudo disk, under an embodiment.

FIG. 3B is a flowchart that illustrates a method of performing block-level backups using a pseudo disk, under an embodiment. In general, a snapshot program utilizes a driver routine that tracks write operations to the disks, as well as tracks writes during the backup operation. According to embodiments of a method, the driver for the snapshot program is configured to read the pseudo disk 305 across its entire length from 0 to n, as shown in block 320. This prevents the need to decipher or translate offsets between the disk and file extents. The driver is further configured to track write operations only upon a full backup request, block 322. It does not track writes as soon as the system boots up, but instead only after a full backup request. This prevents the issue of kernel panics associated with boot up or start up cycles. The driver overwrites the standard kernel I/O routine to track write operations. After a write request is registered, the driver calls back the volume manager to then perform the incremental backups, block 324. In certain cases, the volume manager may be upgraded, in which case any incremental backups may be corrupted due to out-of-date pointers or data structures. In this case, the driver is also configured to overwrite the "going down" or "delete" routine of the kernel to track any updates to the volume manager, block 326. If a change in the volume manager program is detected, the data structures are cleared, and the process re-initiates upon the next full backup request.

In an embodiment, certain features of Unix-based systems are exploited to allow the snapshot driver to track the I/O write operations and the volume manager updates. The Unix kernel is architecturally designed to support entry points to the devices attached to a machine. These entry points are used for reading, writing and sending control commands to the devices. The kernel provides a special entry point for the block devices known as "strategy[8]", this entry point is used for performing buffered I/O to the disk. All major file systems make use of block devices for performing I/O and thus use the "strategy" entry point of the kernel. The kernel structures expose data structures using these default entry points, which can be overwritten or stolen by the backup application driver. Stealing the strategy routine makes sure the backup application gets the I/O first before it is written to the actual device. This ensures that all the writes are intercepted by the backup application, which when tracked gives the backup application information about the blocks that got changed in a particular interval of time. The pseudo devices created by volume managers also expose a block device, and implement strategy routine for these devices. In an embodiment, the snapshot backup application steals the strategy routines of the pseudo device and captures all the writes that happen on the volume through the file system. Tracking these writes enables the snapshot program to perform incremental backups, that is, backing up the changed blocks from the last full backup. Tracking the write operations at the pseudo device level (i.e., at topmost layer in the stack) gives the backup application the advantage of reading these tracked blocks directly from the pseudo disk without requiring any translation to be performed.

Figure 4:
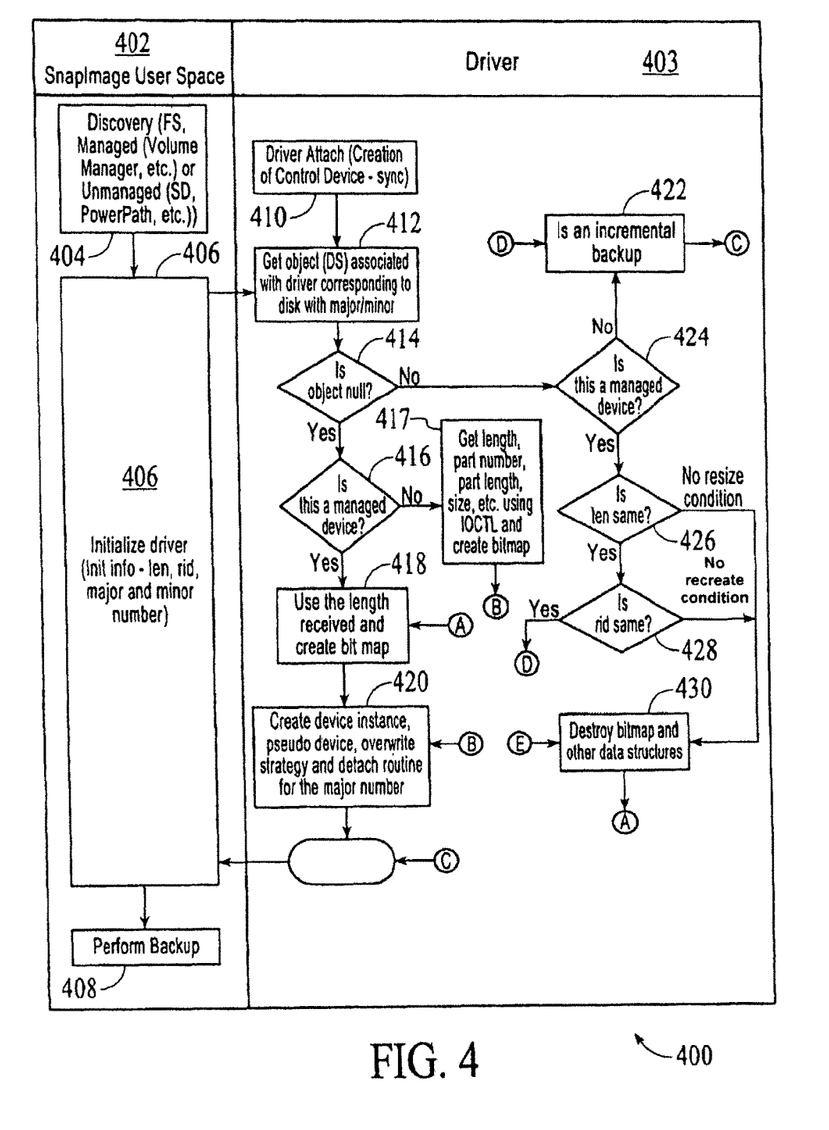
FIG. 4 is a flow diagram illustrating a method for performing a full backup using a pseudo device, under an embodiment.

FIG. 4 is a flow diagram 400 illustrating a method for performing a full backup using a pseudo device, under an embodiment. Flowchart 400 includes two process flows, one for the snapshot user space 402 and one for the driver component 403. The process flow for the snapshot user space 402 begins with a discovery phase 404 in which the file system (FS) and the managed or unmanaged volumes are obtained. The driver is then initialized in block 406. During this initialization phase, the driver is loaded with initialization information including the length of the volume, the record ID and the major and minor number of the volume. The driver then processes this information through its own flow process 403 to perform the backup operation, block 408.

For the embodiment of FIG. 4, the driver flow process 403 begins with a driver attach step 410. Upon initialization 406 of the attached driver by the snapshot user space, the driver gets the object associated with the driver corresponding to the disk identified by the major/minor number pair, block 412. In decision block 414, it is determined whether or not the object is null. If the object is null, the driver next determines if the device is a managed device, block 416. If it is a managed device, the deriver uses the length received and creates a bit map, block 418. The driver then creates the device instance, the pseudo device, and overwrites the strategy and detaches the routine for the major number, block 420. At this point, the backup operation can be performed, block 408. In the case that the device is not a managed device, as determined in block 416, the driver gets the length, the part number, the part length, and so on, using an input/output control (IOCTL), which is a system call for device-specific operations and other operations which cannot be expressed by regular system calls, block 417. The process then proceeds from block 420 in which the device instance is created and the backup is performed.

If, in block 414 it is determined that the object is not null, the process again determines if the device is a managed device, block 424. If the object is not null and the device is managed, the backup is deemed to be in incremental backup, block 422, in which case, the backup operation is performed, block 408. If the object is not null and the device is not managed, the driver then checks to see whether the length of the block is the same as shown in decision block 426. If the length is not the same, a resize condition exists in which case the bitmap and other data structures are destroyed, block 430 and the process proceeds from block 418 to create a bitmap using the length received during the initialization phase. If, in block 426 it is determined that the length is the same then the block has not been resized and the driver checks to see whether the record ID number is the same, block 428. If the RID is the same, then a recreate condition exists in which case the bitmap and other data structures are destroyed, block 430 and the process proceeds from block 418 to create a bitmap using the length received during the initialization phase. If, in block 428 it is determined that the RID is the same, then the driver deems that the operation is an incremental backup and proceeds through block 422 to perform the backup, block 408.

Figure 5:
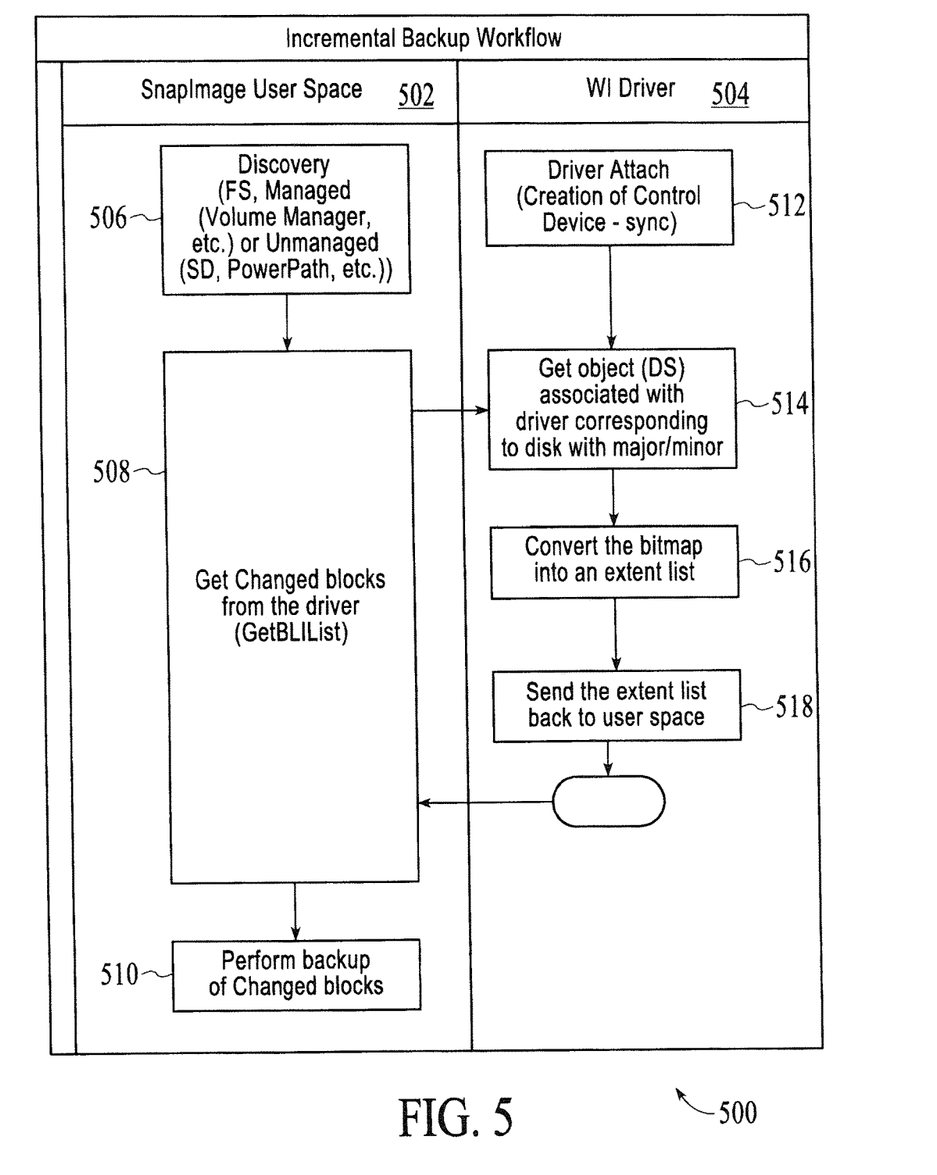
FIG. 5 is a flow diagram illustrating a method of performing an incremental backup using a snapshot program according to embodiments.

FIG. 5 is a flow diagram illustrating a method of performing an incremental backup using a snapshot program according to embodiments. Flowchart 500 includes two process flows, one for the snapshot user space 502 and one for the driver component 504. The process flow for the snapshot user space 502 begins with a discovery phase 506 in which the file system (FS), volume manager (VM) or unmanaged resources are discovered. The changed blocks from the driver are obtained in block 508 through operations performed by the driver in driver flow 504. After the changed blocks are obtained, the snapshot process performs the incremental backup by backing up the changed blocks, block 510.

For the embodiment of FIG. 5, the driver flow process 504 begins with a driver attach step 512. Upon initialization of the attached driver by the snapshot user space, the driver gets the object associated with the driver corresponding to the disk identified by the major/minor number pair, block 514. The driver then converts the obtained bitmap into an extent list, block 514. The extent list is then transmitted back to the user space 502, as shown in block 518, and the incremental backup based on the changed blocks is then performed, block 510.

The advantages of the use of the pseudo disk to perform incremental backups by the snapshot program as described herein are as follows: a particular type of volume manager does not change the format across different operating systems thus making the implementation the same across different operating systems; the backup performed at the pseudo device level gives immunity of any change in the layout format seen across versions; features like hot-swappable and relocation of disk does not hinder the backup, thus giving an assurance of no data loss; the backup running using the volume disk shields from any kind of maintenance activity happening lower in the stack; low-level disk are hidden by the volume manager pseudo disk, thus any failover happening either volumes in case of mirror or paths done by multi-pathing software are hidden, thus giving the snapshot backup applications the benefit and failover do not disrupt the running backup; and high-performance is achieved as reads happen at the highest of the stack making sure multiple accesses to lower disk done by volume manager or multi-pathing software.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method comprising:
   generating, by a volume manager, a pseudo disk that combines a plurality of physical disks where at least two of the plurality of physical disks have different layouts; and
   implementing, by the volume manager, a snapshot backup program to perform an incremental backup of the pseudo disk generated by the volume manager instead of the plurality of physical disks by:
   tracking write operations initiated by the volume manager to write to the pseudo disk and volume manager upgrades during an interval of time using a hook mechanism of a driver associated with the snapshot backup program, the hook mechanism of the driver overwriting a standard input/output routine with a tracking input/output routine and overwriting at least one of a going down routine of a kernel or a delete routine of a kernel with a volume manager upgrade tracking routine, the tracking input/output routine intercepting the write operations before data associated with the write operations is written to a snapshot and the volume manager upgrade tracking routine intercepting upgrades of the volume manager;
   identifying the blocks of the pseudo disk that are affected by each write operation of the tracked write operations; and
   causing the volume manager to be called to perform the incremental backup of the identified blocks by writing the data to the snapshot, the volume manager being called to perform the incremental backup after the snapshot backup program intercepts each of the write operations.

2. The method of claim 1 wherein the snapshot backup program is executed by a UNIX based processing system, and wherein the hook mechanism comprises accessing a strategy entry point of the UNIX kernel.

3. The method of claim 2 wherein the backup of the pseudo disk is a block-level backup performed by the snapshot backup program, the snapshot backup program further performing incremental block-level backups, and further wherein the tracked write operations indicate specific blocks that are updated in a defined period of time.

4. The method of claim 3 wherein the pseudo disk is maintained as an abstract storage device by the volume manager and stores data in a defined format.

5. The method of claim 1, wherein:
   the volume manager upgrade tracking routine tracks a version of the volume manager by providing a hook mechanism that detects a self-initiated unloading of the driver associated with the snapshot backup program, and clears data structures associated with the snapshot backup program upon detection of a change in volume manager version prior to the performance of a next full backup operation.

6. The method of claim 5 wherein the hook mechanism that detects the self-initiated unloading of the driver comprises replacing a delete routine of an operating system executed by a processing system executing the snapshot backup program with the driver.

7. A computer program product, comprising a non-transitory computer-readable medium having a computer-readable program code embodied therein, the computer-readable program code adapted to be executed by one or more processors to:
generate, by a volume manager, a pseudo disk that combines a plurality of physical disks where at least two of the plurality of physical disks have different layouts; and
implement, by the volume manager, a snapshot backup program, the snapshot backup program performing an incremental backup of the pseudo disk instead of the plurality of physical disks by:
tracking write operations initiated by the volume manager to write to the pseudo disk and volume manager upgrades during an interval of time using a hook mechanism of a driver associated with the snapshot backup program, the hook mechanism of the driver overwriting a standard input/output routine with a tracking input/output routine and overwriting at least one of a going down routine of a kernel or a delete routine of a kernel with a volume manager upgrade tracking routine, the tracking input/output routine intercepting the write operations before data associated with the write operations is written to a snapshot and the volume manager upgrade tracking routine intercepting upgrades of the volume manager;
identifying the blocks of the pseudo disk that are affected by each write operation of the tracked write operations; and
causing the volume manager to be called to perform the incremental backup of the identified blocks by writing the data to the snapshot, the volume manager being called to perform the incremental backup after the snapshot backup program intercepts each of the write operations.

8. The computer program product of claim 7 wherein the snapshot backup program is executed by a UNIX based processing system, and wherein the hook mechanism comprises accessing a strategy entry point of the UNIX kernel.

9. The computer program product of claim 8 wherein the backup of the pseudo disk is a block-level backup performed by the snapshot backup program, the snapshot backup program further performing incremental block-level backups, and further wherein the tracked write operations indicate specific blocks that are updated in a defined period of time.

10. The computer program product of claim 7, wherein:
the volume manager upgrade tracking routine tracks a version of the volume manager by providing a hook mechanism that detects a self-initiated unloading of the driver associated with the snapshot backup program, and clears data structures associated with the snapshot backup program upon detection of a change in volume manager version prior to the performance of a next full backup operation.

11. The computer program product of claim 10 wherein the hook mechanism that detects the self-initiated unloading of the driver comprises replacing a delete routine of an operating system executed by a processing system executing the snapshot backup program with the driver.

12. A system comprising:
a first processor-based computer component configured to perform a backup of a pseudo disk that combines a plurality of physical disks instead of a backup of the plurality of physical disks, the pseudo disk created by a volume manager, the pseudo disk being read in a sequential order, where at least two of the plurality of physical disks have different layouts;
a second processor-based component configured to track write operations initiated by the volume manager to write to the pseudo disk and volume manager upgrades during an interval of time using a hook mechanism of a driver associated with the snapshot backup program, the hook mechanism of the driver overwriting a standard input/output routine with a tracking input/output routine and overwriting at least one of a going down routine of a kernel or a delete routine of a kernel with a volume manager upgrade tracking routine, the tracking input/output routine intercepting the write operations before data associated with the write operations is written to a snapshot and the volume manager upgrade tracking routine intercepting upgrades of the volume manager, and identify the blocks that are affected by each write operation of the tracked write operations; and
a third processor-based component configured to cause the volume manager to be called to perform the write operations to the snapshot, using the snapshot backup program on the pseudo disk, in response to detecting that each write operation has been initiated by the volume manager, the volume manager being called to perform the incremental backup after the snapshot backup program intercepts each of the write operations.

13. The system of claim 12 wherein the snapshot backup program is executed by a UNIX based processing system, and wherein the hook mechanism is configured to access a strategy entry point of the UNIX kernel.

14. The system of claim 13 wherein the backup of the pseudo disk is a block-level backup performed by the snapshot backup program, the snapshot backup program being further configured to perform incremental block-level backups, wherein the tracked write operations indicate specific blocks that are updated in a defined period of time.

15. The system of claim 14 wherein the pseudo disk is maintained as an abstract storage device by the volume manager and stores data in a defined format.

16. The system of claim 12, wherein the volume manager upgrade tracking routine tracks a version of the volume manager by providing a hook mechanism that detects a self-initiated unloading of the driver associated with the snapshot backup program, and clears data structures associated with the snapshot backup program upon detection of a change in volume manager version prior to the performance of a next full backup operation.

17. The system of claim 16 wherein the hook mechanism that detects the self-initiated unloading of the driver is configured to replace a delete routine of an operating system executed by a processing system executing the snapshot backup program with the driver.

* * * * *